US011648496B2

(12) United States Patent
Benjamin et al.

(10) Patent No.: US 11,648,496 B2
(45) Date of Patent: May 16, 2023

(54) TREATMENT MODULE AND OPERATING METHOD THEREFOR

(71) Applicant: MicroHAOPs, Inc., Seattle, WA (US)

(72) Inventors: Mark Benjamin, Seattle, WA (US); Zhenxiao Cai, Seattle, WA (US); Alexander Vetrovs, Seattle, WA (US); Bolun Wang, Seattle, WA (US)

(73) Assignee: MicroHAOPs, Inc., Seattle, WA (US)

( * ) Notice: Subject to any disclaimer, the term of this patent is extended or adjusted under 35 U.S.C. 154(b) by 261 days.

(21) Appl. No.: 17/070,762

(22) Filed: Oct. 14, 2020

(65) Prior Publication Data

US 2021/0039026 A1 Feb. 11, 2021

Related U.S. Application Data

(63) Continuation-in-part of application No. PCT/US2020/024524, filed on Mar. 24, 2020.

(60) Provisional application No. 62/823,418, filed on Mar. 25, 2019.

(51) Int. Cl.
| | |
|---|---|
| *B01D 29/05* | (2006.01) |
| *B01D 39/20* | (2006.01) |
| *B01D 29/66* | (2006.01) |
| *C02F 1/00* | (2023.01) |
| *C02F 1/28* | (2023.01) |

(Continued)

(52) U.S. Cl.
CPC ......... *B01D 39/2079* (2013.01); *B01D 29/05* (2013.01); *B01D 29/66* (2013.01); *B01D 39/2062* (2013.01); *C02F 1/004* (2013.01); *C02F 1/281* (2013.01); *C02F 1/283* (2013.01); *B01D 2201/0415* (2013.01); *B01D 2239/0407* (2013.01); *C02F 2101/105* (2013.01); *C02F 2101/30* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 3,695,443 | A | 10/1972 | Schmidt, Jr. | |
| 3,935,105 | A * | 1/1976 | McEwen | B01D 21/245 210/138 |
| 4,051,033 | A | 9/1977 | Blace | |

(Continued)

FOREIGN PATENT DOCUMENTS

| | | |
|---|---|---|
| CN | 101757854 A | 6/2010 |
| CN | 107635637 A | 1/2018 |

(Continued)

OTHER PUBLICATIONS

J. Kim et al., NOM fouling mechanisms in a hybrid adsorption/membrane system, Journal of Membrane Science, 349 (2010) 35-43 (available on-line 2009) (Year: 2009).*

(Continued)

*Primary Examiner* — Chester T Barry

(57) ABSTRACT

A treatment module including a housing having an input port and an output port; a plurality of treatment members, each treatment member having a skeleton and a mesh material provided over the skeleton, the mesh material being joined to the skeleton at one or more portions of the skeleton; and a layer of particles formed over a first side of the mesh material, the layer having pores of sufficient size to enable a fluid to flow through the layer.

22 Claims, 17 Drawing Sheets

(51) Int. Cl.
  *C02F 101/10* (2006.01)
  *C02F 101/30* (2006.01)

(56) References Cited

U.S. PATENT DOCUMENTS

| | | | | |
|---|---|---|---|---|
| 4,272,263 | A | * | 6/1981 | Hancock ............ B01D 46/4281 55/377 |
| 4,517,086 | A | * | 5/1985 | Romey ................. B01D 29/72 210/334 |
| 5,118,421 | A | * | 6/1992 | Scarano ................ B01D 29/15 210/485 |
| 5,492,635 | A | * | 2/1996 | Ball ..................... B01D 35/027 210/802 |
| 5,505,841 | A | * | 4/1996 | Pirbazari ............... B01D 61/16 210/639 |
| 5,800,580 | A | * | 9/1998 | Feldt ..................... B01D 46/06 55/378 |
| 7,662,291 | B2 | | 2/2010 | Krogue et al. |
| 8,070,951 | B2 | | 12/2011 | Benjamin et al. |
| 2009/0283468 | A1 | | 11/2009 | Nomura |
| 2010/0258497 | A1 | * | 10/2010 | Morita ................ B01D 65/003 210/323.2 |

FOREIGN PATENT DOCUMENTS

| | | |
|---|---|---|
| WO | WO2009106084 A1 | 9/2009 |
| WO | WO2012071815 | 6/2012 |

OTHER PUBLICATIONS

Kim, et al., "Effects of adsorbents on membrane fouling by natural oranic matter", Journal of Membrane Science, 2007.
Modarresi, et al., "Insights and Model for Understanding Natural Organic Matter Adsorption onto Mixed Adsorbents", Environmental Science and Technology, 2018.
Supplementary Partial European Search Report for related EP Application No. 20778627.8, dated Aug. 1, 2022.
International Search Report for related SG application No. 11202110234X, dated Jan. 6, 2023.

\* cited by examiner

500

1140

TREATMENT MODULE AND OPERATING METHOD THEREFOR

CROSS-REFERENCE TO RELATED APPLICATIONS

The present application is a by-pass continuation-in-part of PCT Patent Application No. PCT/US20/24524, filed on Mar. 24, 2020, which claims the benefit of U.S. Provisional Patent Application No. 62/823,418, filed on Mar. 25, 2019, which are incorporated by reference herein for all purposes.

BACKGROUND

The present disclosure relates to purification systems and methods, in particular to a treatment member, a treatment module (or a treatment reactor) including the treatment member, a purification system including the treatment module, and methods for operating the treatment module.

Microgranular adsorptive filtration (μGAF) reactors are considered to be a promising purification system because they are able to remove contaminants with great efficiency during a purification process. For example, a μGAF reactor removes contaminants from water using a relatively thin layer of adsorbent particles deposited on a permeable support structure, and the deposited layer of adsorbent particles is removed at the end of each treatment cycle. Although the contaminants may be removed efficiently, the removal of the deposited layer requires relatively large amounts of water and energy, which increases the treatment cycle time and costs. It would be desirable to make the μGAF reactor more cost effective for use in a purification process.

SUMMARY

Embodiments of the present application relate to purification systems and methods, in particular to a treatment member, a treatment module including the treatment member, a purification system including the treatment module, and a method for operating the treatment module.

In an embodiment, a treatment module includes a housing having an input port and an output port; a plurality of treatment members, each treatment member having a skeleton and a mesh material provided over the skeleton, the mesh material being joined to the skeleton at one or more portions of the skeleton; and a layer of particles formed over a first side of the mesh material, the layer having pores of sufficient size to enable a fluid to flow through the layer.

In an embodiment, the skeleton extends along a first direction and having a length L along the first direction, and the mesh material is flexible. The skeleton is configured to prevent the mesh material from collapsing entirely inward when a force is applied inward to the mesh material.

In an embodiment, the mesh material is joined to the skeleton at first and second points of the skeleton along the first direction, the first and second points being separated from each other by at least L/10, so that the mesh material is able to fluctuate.

In an embodiment, the mesh material has dimensions such that when an appropriate force is applied, a gap of 1-10 mm is established between the mesh and the skeleton except at and near points of attachment. The first and second points of the skeleton are at first and second ends of the skeleton. The mesh material is joined to the skeleton at one or more points along the first direction, the plurality of points being provided between the first and second ends of the skeleton, and wherein the first side of the mesh material is a side facing the skeleton or a side opposing the skeleton.

In an embodiment, the treatment module includes a first end piece joining the mesh material to the first end of the skeleton; and a second end piece joining the mesh material to the second end of the skeleton.

In an embodiment, the mesh material is joined to the skeleton only at the first and second ends of the skeleton, whereby the mesh material is loosely covering the skeleton in order to allow the mesh material to fluctuate when forces are applied to the mesh material.

In an embodiment, the skeleton has an elongated shape along the first direction, and the mesh material has a tubular shape covering the skeleton.

In an embodiment, the skeleton has an elongated shape along the first direction, and the skeleton includes a plurality of ribs, the ribs having a geometry that allows fluid to flow therethrough in parallel to and perpendicular to the first direction.

In an embodiment, the skeleton further includes a rod held by the ribs, the rod providing a structural support for the element along the first direction. The mesh material is formed as a flat sheet over the skeleton. Each of the treatment members is configured to be removable from the housing. The treatment members are bonded together at least on one end by potting.

In another embodiment, a treatment member includes a skeleton including a plurality of ribs and optionally a stiffening rod and extending along a first direction, the rod providing a structural rigidity for the skeleton along the first direction; and a flexible mesh tube provided around the skeleton and configured to fluctuate when forces are applied to the mesh tube. The mesh tube has an inner diameter of at least 3 mm. The mesh tube is joined to the skeleton at first and second points of the skeleton along the first direction, the first and second points being separated from each other by at least L/10.

In yet another embodiment, a method for a treatment module includes providing a plurality of a treatment members, each treatment member having a support structure and a mesh material provided over a first side of the support structure; flowing a first fluid of a first type through the treatment members; and flowing a second fluid of a second type through the treatment members, the first and second types being different fluid types; wherein forces applied by the first and second fluids to the mesh material cause particles collected on the mesh material to be released from the mesh material.

In an embodiment, the method relates to cleaning the treatment module, and the mesh material is flexible and is configured to fluctuate or partially collapse and expand chaotically when the forces are applied to the mesh material by the first and second fluids.

In an embodiment, the method includes flowing a third fluid of the first type through the treatment members; and flowing a fourth fluid of the second type through the treatment members, wherein the fluids of the first type are gas, and the fluids of the second types are liquid.

In an embodiment, the first and second fluids are flowed through the treatment members in a first direction, and the third and fourth fluids are flowed through the treatment members in a second direction that is substantially orthogonal to the first direction.

In an embodiment, each of the treatment members includes a layer formed on the mesh material, with the layer comprising contaminant-collecting particles. A solution including contaminants is flowed through the treatment members, the layer of contaminant-collecting particles formed on the mesh material collecting the contaminants in the solution. The forces applied by the fluids cause the contaminants collected by the layer to be released from the mesh material.

In an embodiment, the support structure is a skeleton having a plurality of ribs and optionally a stiffening rod, the skeleton having an elongated shape extending along the first direction, and wherein the mesh material covers the skeleton and has a tubular shape.

DETAILED DESCRIPTION

Figure 1:
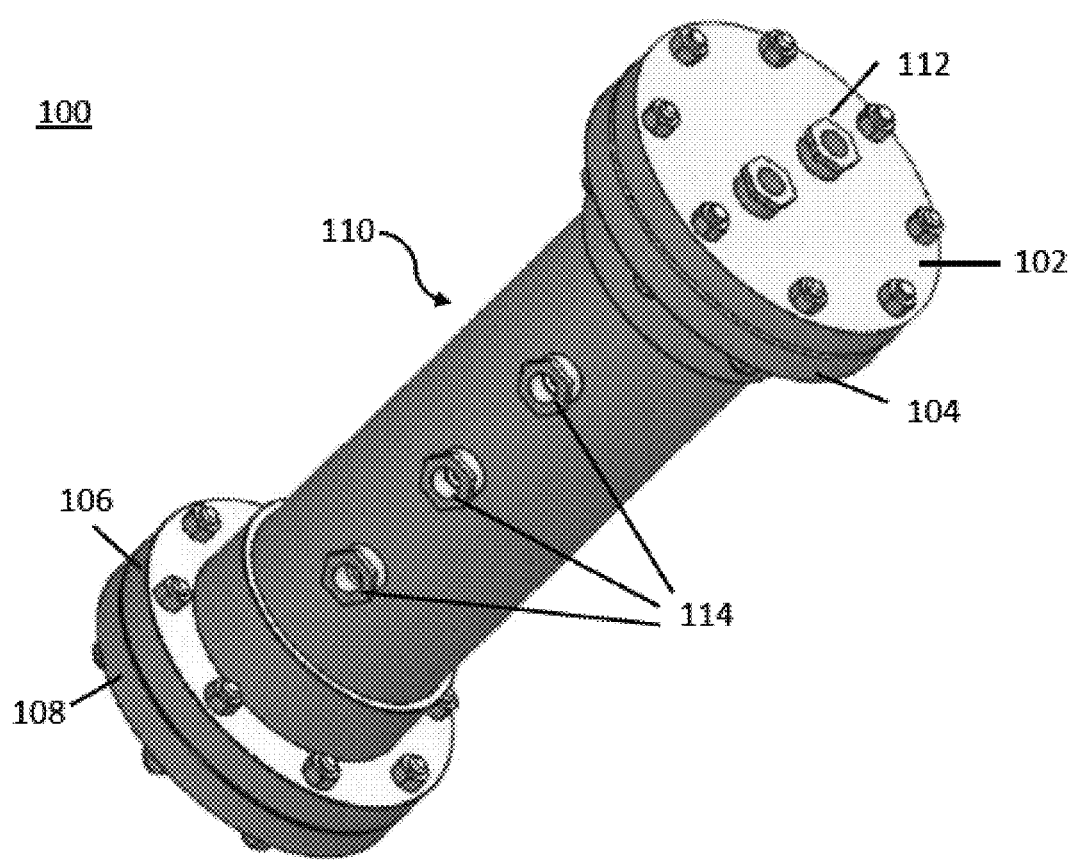
FIG. 1 illustrates a treatment module according to an embodiment.

Embodiments of the present application relate to purification systems, apparatus, and methods. More specifically, embodiments relate to a treatment member, a treatment module (or treatment reactor) including the treatment member, a purification system including the treatment module, and a method for operating the treatment module.

In an embodiment, a treatment module includes a housing having an input port and an output port; a plurality of treatment members, each treatment member having a skeleton and a mesh material provided over the skeleton; and a layer of particles formed over a first side of the mesh material, the layer having pores of sufficient size to enable a fluid to flow through the layer. The mesh material is joined to the skeleton at one or more locations of the skeleton. The treatment module includes a relatively large number of treatment members. Thus the total surface area of the treatment members in the treatment module for removing contaminants is relatively large, increasing the removal efficiency and making the module more suitable for industrial-scale applications.

In an embodiment, a method for a treatment module includes providing a plurality of treatment members, each treatment member having a support structure and a mesh material provided over the support structure; depositing a layer of contaminant-collecting particles on a first side of the mesh material; passing feed solution through the particle layer and the mesh to remove contaminants from the solution; and cleaning the module to flush the particles and contaminants out of it. In the cleaning step, a first fluid of a first type is flowed through the treatment members. A second fluid of a second type is flowed through the treatment members. A third fluid of the first type is flowed through the treatment members. A fourth fluid of the second type is flowed through the treatment members. The first and second fluids are flowed through the treatment members in a first direction, and the third and fourth fluids are flowed through the treatment members in a second direction that is substantially orthogonal to the first direction. The first and second fluids flowing through the treatment members in the first direction and the third and fourth fluids flowing through the treatment members in the second direction apply forces to the mesh material that make it fluctuate, thereby effectively releasing particles from the mesh material. As used herein, the term "fluctuate" refers to any continuous, periodic or chaotic motion of the mesh material including, but not limited to, vibration, oscillation, pulsation, and shaking. For example, the periodic motion may be characterized by one or more sub-periodic motions, each of which is represented by an amplitude, a frequency, and a period that vary with one or more of a distance between adjacent points joining the mesh material to the skeleton, material properties of the mesh material, and forces applied to the mesh material. The forces applied to the mesh material may vary with characteristics of one or more fluids flowing through the tubes.

In an embodiment, the fluids of the first type are gas, and the fluids of the second type are liquid. Using a mixture of gas (e.g., air) and liquid (e.g., water) may reduce the amounts of water and energy required during the cleaning process and simplify the structure of a treatment system including the treatment module, compared to a process that only uses water during the cleaning process.

A detailed description of embodiments is provided below along with accompanying figures. The discussion focuses on an embodiment in which the treatment elements are cylindrical tubes and the flow of water during the particle deposition and water treatment steps is inside-out, i.e., the flow enters the interior of the tube and at least a portion of the flow passes through the mesh to reach the exterior of the tube. In this embodiment, the interior of the tube is defined as the 'first side' of the mesh, and the exterior as the 'second side'. The same general discussion would apply to alternative embodiments (e.g., alternative geometries for the treatment module and treatment members and/or alternative flow patterns), with the following definitions:

1. The 'first side' of the element is defined as the side on which particles are deposited, and the 'second side' is the other side (where little or no particles are deposited);
2. During particle deposition, flow is from the first side of the mesh to the second side (i.e., the particle layer forms on the first side);

3. During the treatment step, the feed water passes from the first side to the second side (i.e., first through the particle layer and then through the mesh or other material that holds the particle layer), and
4. During the cleaning process, either a single fluid type or a mixture of two fluid types can flow from the second side to the first side (backwashing); similarly, either a single fluid type or a mixture of two fluid types can flow parallel to the mesh on the first side (flushing).

The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative and are not intended to be exclusive or limiting. For the purpose of clarity, technical material that is known in the technical fields related to this disclosure has not been described in detail so that the disclosure is not unnecessarily obscured.

FIG. 1 shows a treatment module (or a treatment reactor) 100 according to an embodiment. The treatment reactor 100 may include a housing 110. A first outer end plate 102 and a first inner end plate 104 are provided on a first end of the housing 110. A second outer end plate 108 and a second inner end plate 106 are provided on a second end of the housing 110. The first and second ends are on opposing sides in the present embodiment. A plurality of side ports 114 is provided on a side of the housing 110, and a plurality of end ports 112 is provided on the first end of the housing 110. One or more end ports (not shown) are also provided on the second end of the housing 110.

Although the treatment reactor 100 illustrated includes three side ports 114 on a side surface (or the "shell" side of the reactor) and two end ports 112, the number and locations of the ports may vary according to implementation. The size of the reactor 100 may depend on the water flow rate to be treated. For example, the reactor 100 may be 7.5-to-60 cm in diameter and 30-to-215 cm long. In an embodiment, the reactor 100 may further include any standard plumbing material that meets the regulatory requirements (e.g., NSF-certified if the water being treated is for human consumption) and is chemically compatible with the water to be treated.

Figure 2:
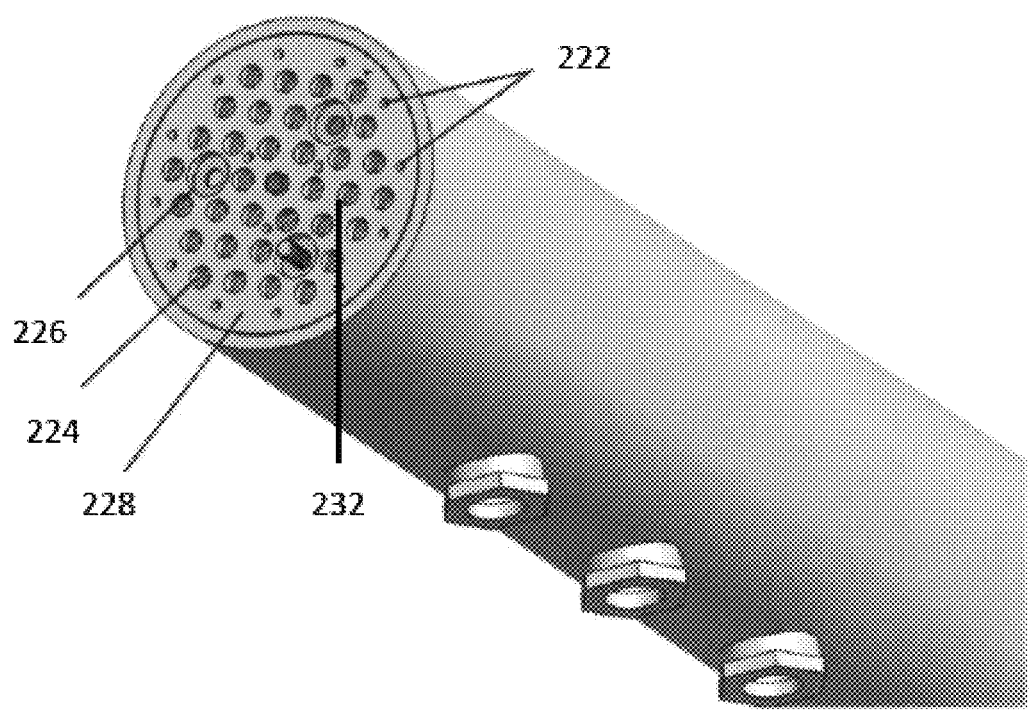
FIG. 2 illustrates one end of a treatment module with plates removed according to an embodiment.

FIG. 2 illustrates one end of a treatment module (or a treatment reactor) 200 with plates removed according to an embodiment. For example, the plates removed may correspond to the first outer end plate 102 and the first inner end plate 104. The reactor 200 includes a plate 228 having first holes (e.g., small holes) 222, second holes (e.g., medium holes) 224, and third holes (e.g., large holes) 226. The small holes 222 are for screws that secure the plate 228 to the second plate (not shown). The medium holes 224 are configured to receive end pieces 250 of treatment members (e.g., treatment tubes 320 in FIG. 3). The large holes 226 are configured to receive support rods 232.

Figure 3:
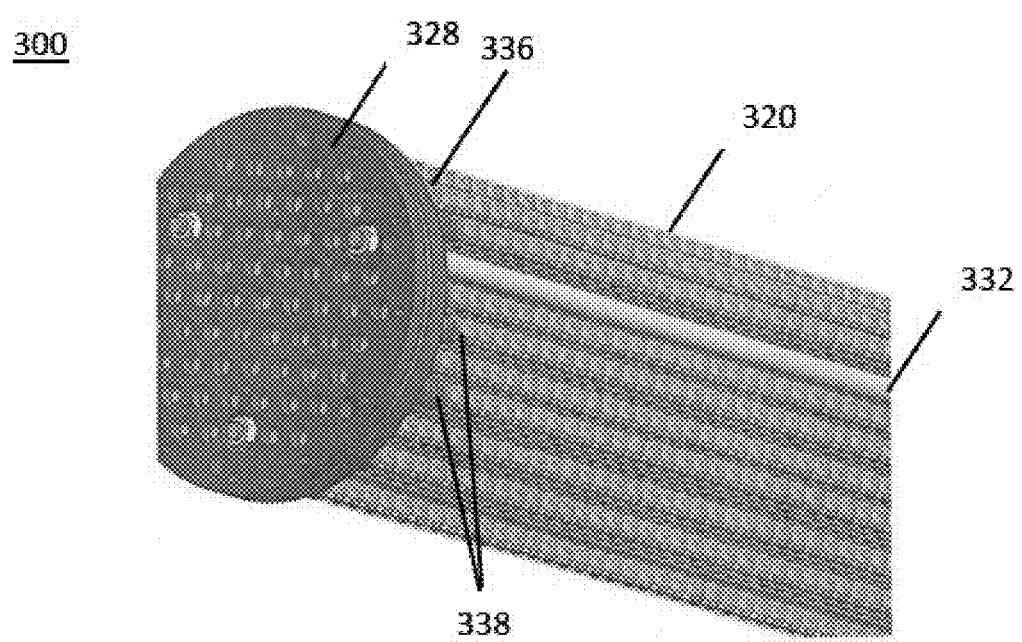
FIG. 3 illustrates a plurality of treatment members and a rigid rod in a treatment module according to an embodiment.

FIG. 3 illustrates a plurality of treatment members and a rigid rod in a treatment module (or a treatment reactor) 300 according to an embodiment. Each treatment member 320 includes a skeleton (e.g., a skeleton 440 in FIG. 4), a stiffening rod aligned longitudinally through the center of the skeleton, and a mesh material (e.g., a mesh tube 670 shown in FIG. 6) that is disposed over the skeleton. The Figure also shows a rigid rod 332 and a few end pieces 338.

In an embodiment, the treatment module 300 may include dozens of treatment members 320. Each of these treatment members may be removable and replaced with a new treatment member, if desirable.

An operation of a treatment reactor according to an embodiment will be described below in more detail with reference to FIGS. 1, 2, and 3. In an exemplary embodiment, the operation of the system includes three stages.

Particle Deposition.

The first stage is deposition of contaminant-collecting (e.g., adsorbent) particles on the first side of the mesh tubes or other support surfaces. For example, these support surfaces may include an inner surface of a mesh material wrapped over or around a skeleton. This stage is initiated by injection of an aqueous slurry of the particles either accompanied or followed by injection of clean water into the reactor 300 such that the fluid enters the interiors of the mesh tubes. Simultaneously, permeation across the mesh tubes is allowed; this permeation flow carries the adsorbent particles to the tube walls, where they are captured as the water flows through the walls. As a result, a layer of the adsorbent particles is formed on the inner surface of the mesh tube of each of the treatment members 320 (i.e., the inner surface is defined as the 'first side' of the tube in this embodiment). The step may continue until substantially all the particles have been deposited in layers adjacent to the tube walls. In an alternative deposition process, the particle slurry can be injected on the outer surface of the mesh tube (in which case the outer surface of the tube is defined as the 'first side') and pass through the mesh, so that the particle layer is deposited on the exterior of the tube.

In an embodiment, the injected solutions can be recirculated axially to facilitate uniform deposition of the particles along the tube walls, and the permeating water can be returned to the tube inlet to minimize loss of both the adsorbent particles and water during this step.

The slurry concentration and water inflow rate should be chosen to assure that particles do not settle appreciably as the water flows through the element. Optimal values may depend on the particle size and density and the length and orientation of the tubes; typical values are 20-100 grams of solids per liter in the slurry and a liquid flow velocity of 0.2-100 cm/s in the axial direction. The portion of the incoming fluid that is recirculated can range from zero to 80% of the flow rate. Correspondingly, the portion that permeates across the mesh can range from 20% to 100% of incoming fluid. The step continues until a cake layer containing the injected particles is deposited on the tube walls.

In an embodiment, this process takes 0.5-20 min. Typical thicknesses of the deposited layer can range from 0.1 to 5 mm. The particles of the deposited layer may include various types of particles suitable for water treatment. For example, the particles may be HAOPs (Heated Aluminum Oxide Particles), HIOPs (Heated Iron Oxide Particles), PAC (powdered activated carbon) particles, or a combination thereof.

Feed Water Filtration.

The second stage in the process is filtration of the feed water to remove the target contaminants. During this step, the flow enters the reactor 300 and the interior of the tubes. The flow can enter either or both ends of the tubes. When the flow enters only one end, the opposite end can be closed (dead-end operation) or the opposite end can be open, allowing flow to exit and then be returned to the inlet (recirculating flow or crossflow).

Throughout this step, the permeation line is opened by an amount that allows the desired rate of outflow from the modules. The outflow is typically expressed as a flux, representing the water flow rate (e.g., liters/hour) divided by the surface area of the tubes (e.g., square meters) to yield a value with units of volume per unit area per unit time (e.g., liters per square meter per hour, LMH).

The acceptable amount of flux depends on the identity and concentration of contaminants in the water, the properties of the deposited particles (e.g., the particle size distribution) and the thickness of the deposited layer. For example, the amount of the flux may be 10-2000 LMH. Filtration may continue until one or more user-defined limits are reached. For example, these limits might relate to the duration of the filtration step (for example, 2-24 hours), the concentration of contaminant in the permeate (for example, 20-80% of the concentration in the feed, or a fixed value set by regulation), and the pressure loss as water passes through the particle layer and tube wall (for example, 0.1-2.0 bar).

Particle Removal and System Cleaning.

Once the filtration step ends, the layers of deposited particles and the materials (e.g., contaminants) collected by the particles are removed from the system. The particles are separated from the tube wall by using one or more fluids that are forced through the tube from the outside-in (backwashing, with flow across the mesh from the second side to the first side) and/or injected into the interior of the tube at one end (tangential or cross flow, or flushing, with flow parallel to the first side of the mesh). Depending on implementation, a single type of fluid (e.g., water or air) or a combination of fluids (e.g., water and air) may be used for this process.

In an embodiment, a combination of fluids (e.g., water and air) is injected into the reactor through the end ports and/or through the side ports of the reactor. Water and air are forced through the tubes axially, shearing more particles off the wall and carrying all the particles and contaminants out of the system (flushing). If reactors (e.g., the treatment reactor 100 in FIG. 1) are oriented vertically, the flows can be either upward or downward (and, during backwashing, can be both). These steps can be carried out in various manners.

In an embodiment, the duration of each step may be 0.1-10 seconds, with a complete cleaning step comprising one to 10 steps each of backwashing and flushing.

In an embodiment, a first mixture of water and air may flow in a first direction and a second mixture may flow in a second direction intersecting the first direction, thereby removing the deposited particles on the first side of the tubes and discharging the removed particles along with the contaminants from the tubes. For example, referring to FIG. 1, a first mixture may enter the tubes of the treatment reactor 100 through end ports (not shown) of the second outer end plate 108 and flow in the longitudinal direction of the reactor 100, and a second mixture may enter the treatment reactor 100 through the side ports 114 in a direction perpendicular to the longitudinal direction (e.g., the radial direction of the reactor 100), thereby making the tubes in the reactor 100 fluctuate to effectively release the particles from the inner surfaces of the tubes.

The forces applied to the mesh material may vary with characteristics of one or more fluids flowing through the tubes. For example, a flow rate of a liquid in the first mixture may be in a range that generates an average axial velocity from 2 to 50 cm/s, and a flow rate of a liquid in the second mixture may be in a range that generates an average flux across the mesh from 100 to 10,000 LMH. In both mixtures, a ratio of the flow rate of gas to the flow rate of liquid may be in a range from 0 to 1 L of gas (at the given temperature and pressure) per L of liquid. The pressure of the injected gas may be in a range from 0 to 3 bar (~44 psi). In an embodiment, the process is applicable at any temperature at which the fluid being used is in a liquid form.

In an embodiment, the second mixture may flow toward the tubes during a first time interval for backwashing, and then the first mixture may flow through the tubes during a second time interval for flushing.

In another embodiment, the first mixture and the second mixture may flow substantially simultaneously during a given time interval (e.g., 0.1 to 10 seconds). The use of a mixture of water and air during the cleaning process causes the mesh tubes to fluctuate more vigorously than when only water is used. Accordingly, water may be injected with lower pressure to remove the particles from the mesh, which conserves water and simplifies a water treatment system for the treatment reactor 100.

Figure 4:
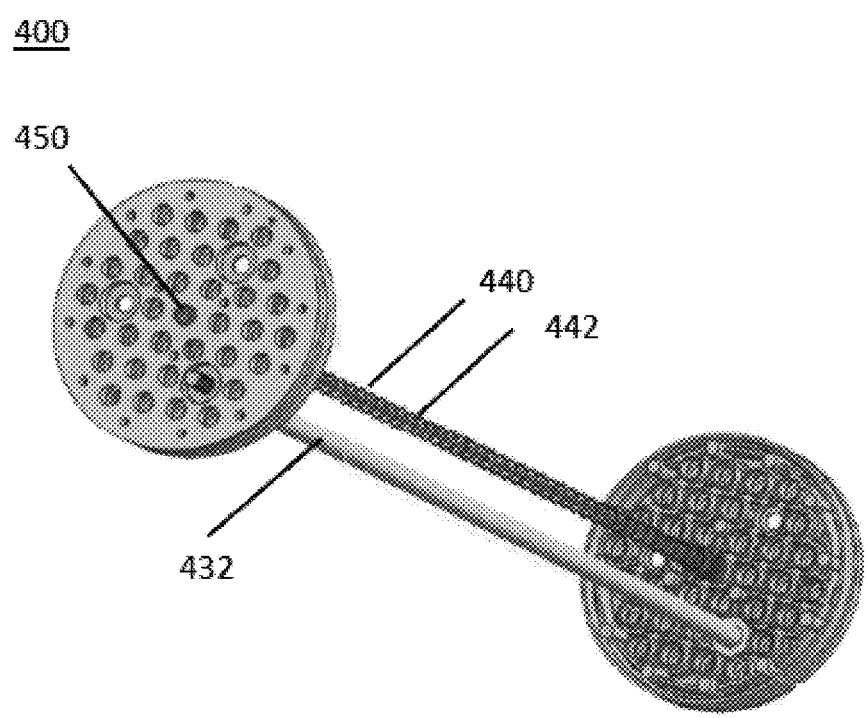
FIG. 4 illustrates a rigid rod and a skeleton for a treatment member according to an embodiment.

FIG. 4 illustrates a rigid support rod 432 and a support structure (e.g., a skeleton) 440 in a treatment module (or a treatment reactor) 400 according to an embodiment. The skeleton 440 is part of a treatment member (e.g., a treatment member 620 in FIG. 6) and facilitates a mesh material (e.g., a mesh tube 670 in FIG. 6) to retain its shape when it is placed over the skeleton. It also prevents a mesh tube from collapsing completely when forces are applied to the exterior wall of the tube (e.g., during the particle removal step). The skeleton 440 will be described in greater detail below with reference to subsequent drawings.

Figure 5:
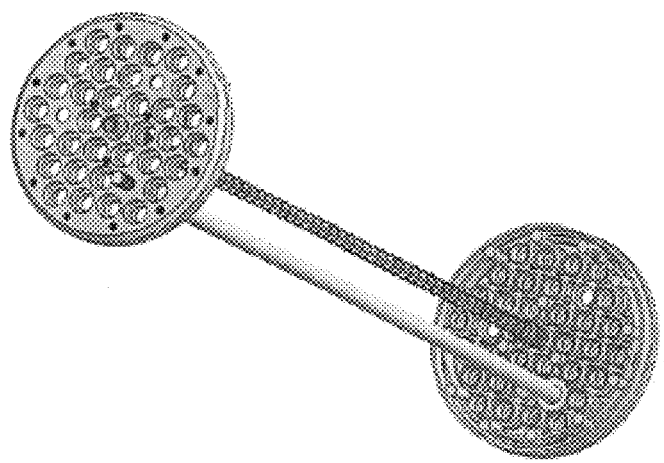
FIG. 5 illustrates the treatment module of FIG. 4 with an outer plate removed according to an embodiment.

In an embodiment, an inner stiffening rod 442 is disposed within the skeleton 440 to help it to retain its vertical shape. The inner rod 442 may include a stiff material such as fiberglass or the like. The skeleton 440 is coupled to an end-piece 450 on each of its ends. The end-pieces 450 are inserted into the holes in the plates P1 and P2 to keep the skeleton 440 in its place. FIG. 5 shows a treatment module 500 with an outer plate P1 removed.

Figure 6:
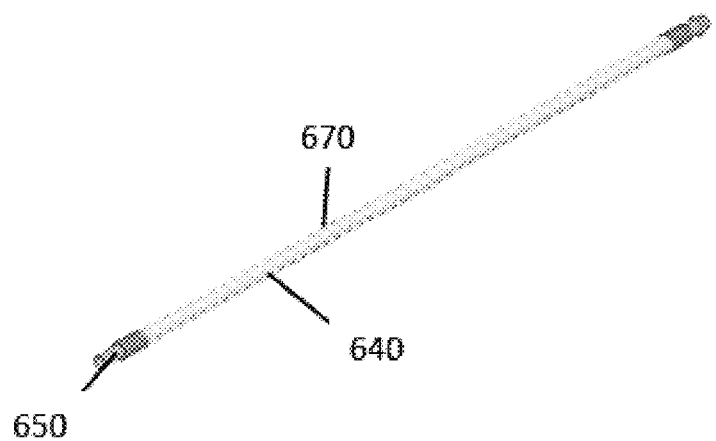
FIG. 6 illustrates a treatment member according to an embodiment.

FIG. 6 shows a treatment member 620 according to an embodiment. The treatment member 620 may include a skeleton 640, a stiffening rod, a pair of end pieces 650, and a mesh material (e.g., a mesh tube) 670 that has been slipped over the skeleton 640 and attached to the end pieces 650 by any appropriate bonding approach (e.g., glue, or heat or ultrasonic welding).

The skeleton 640 extends along a first direction (e.g., an axial direction of the mesh tube 670) and has a given length L along the first direction. The mesh tube 670 may be joined to the skeleton 640 at a plurality of points on the skeleton 640 along the first direction, e.g., first and second points that are adjacent points. An amplitude of the mesh tube 670 with which the mesh tube 670 fluctuates may vary based on the distance separating these points and the material properties of the mesh tube 670.

In an embodiment, the distance between adjacent points is provided to be at least L/10, or at least L/5, or at least L/3.

In an embodiment, the diameter of a mesh tube is 0.5-5 mm larger than the diameter of the skeleton. For other geometries (e.g., flat sheets), the mesh is loose enough to allow a gap of 0.5 to 10 mm between the mesh and the skeleton at a point midway between two attachment points, when a force is applied causing the mesh to separate from the skeleton.

Figure 7:
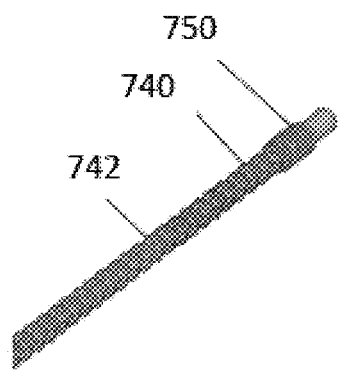
FIG. 7 illustrates a skeleton, a stiffening rod, and an end-piece according to an embodiment.
Figure 8:
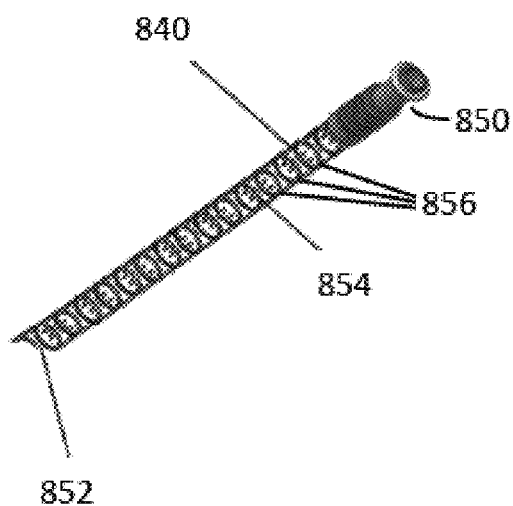
FIG. 8 illustrates the skeleton in FIG. 7 with the stiffening rod removed according to an embodiment.

FIGS. 7 and 8 illustrate a skeleton 740, 840 according to an embodiment. The skeleton 740 is attached an end-piece 750 and has an inner stiffening rod 742 inserted therein. The skeleton 840 is shown attached to an end-piece 850, but the rod is removed to better illustrate the structure of the skeleton. The skeleton 840 has a plurality of ribs 852 attached to supporting members (e.g., longitudinal members) 854. Each of the longitudinal members 854 extends in a longitudinal direction of the skeleton 840 and couples the ribs 852. Each of the ribs 852 includes one or more prongs 856 that protrude from an inner surface to receive and hold the rod in place. The rod provides structural rigidity for the ribs 852 along the longitudinal direction of the skeleton 840.

In an embodiment, each skeleton is disposed inside a loosely fitting mesh material (e.g., the mesh tube 670 in FIG. 6). When water or a mixture of water and air flows from outside to inside the tube, the skeleton 740 prevents the tube from collapsing on itself.

In an embodiment, the rod occupies a space in the skeleton so that water or a mixture of water and air entering the skeleton may flow out of the treatment module more quickly. In an embodiment, a diameter for the rod 742 is 1-to-5 mm.

In an embodiment, the skeleton 740 may include a material that meets the same requirements as the module shell (e.g., the housing 110 in FIG. 1). The skeleton 740 may be constructed by connecting a plurality of sub-skeletons, each of which is 7.5-to-61 cm in length, together to reach a desired length. In an embodiment, the diameter of the skeleton 740 is from 0.2-to-2.0 cm, with gaps between adjacent ribs 852 being 0.6-to-5.1 cm.

Figure 9:
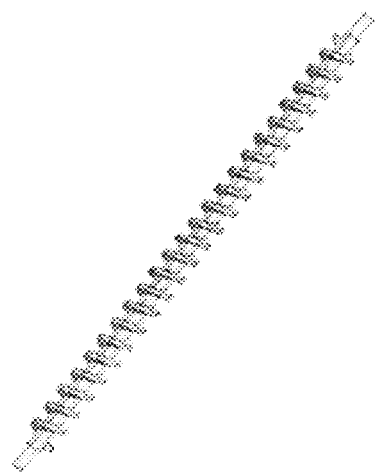
FIG. 9 illustrates a skeleton according to a different embodiment.

FIG. 9 illustrates a skeleton according to another embodiment. The skeleton is designed to prevent the mesh tube from completely collapsing when forces are applied from its outside toward its inside, and to provide a path for axial flow of fluids between the mesh and the skeleton when such forces are applied and the mesh is partially collapsed.

Figure 10A:
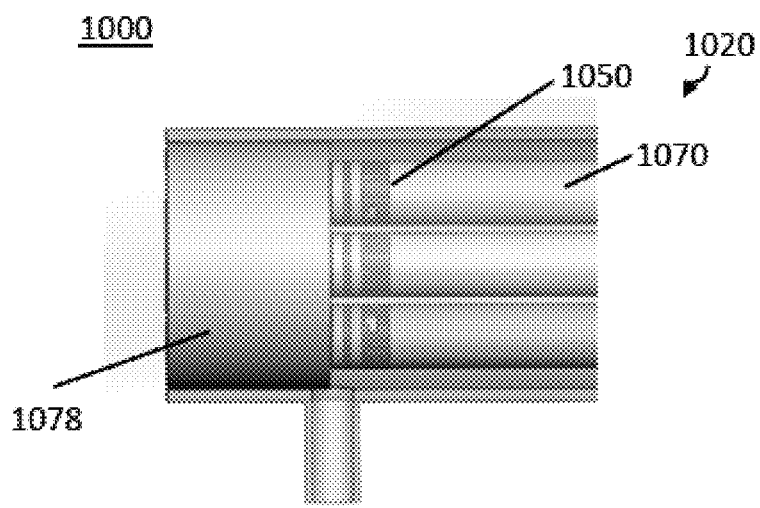
FIGS. 10A and 10B illustrate a side view and an end view of a treatment module with potted elements according to an embodiment.
Figure 10B:
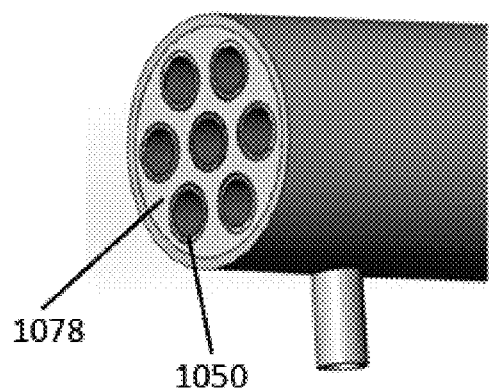

FIGS. 10A and 10B show a side view and an end view of a treatment module 1000, respectively, according to an embodiment. The treatment module 1000 may include tens to hundreds of treatment members 1020 and may be suitable for use in a larger scale application. Each treatment member 1020 includes a mesh tube 1070, a stiffening rod, and a pair of end pieces 1050. The treatment members 1020 are permanently fixed at one or more ends using fixing supports 1078. For example, the treatment members 1020 may be fixed in place by potting end portions of the treatment members 1020 using an epoxy resin to form the fixing supports 1078. The fixing supports eliminate the need for end plates and thereby simplify and lower the cost for construction of the module.

Figure 11:
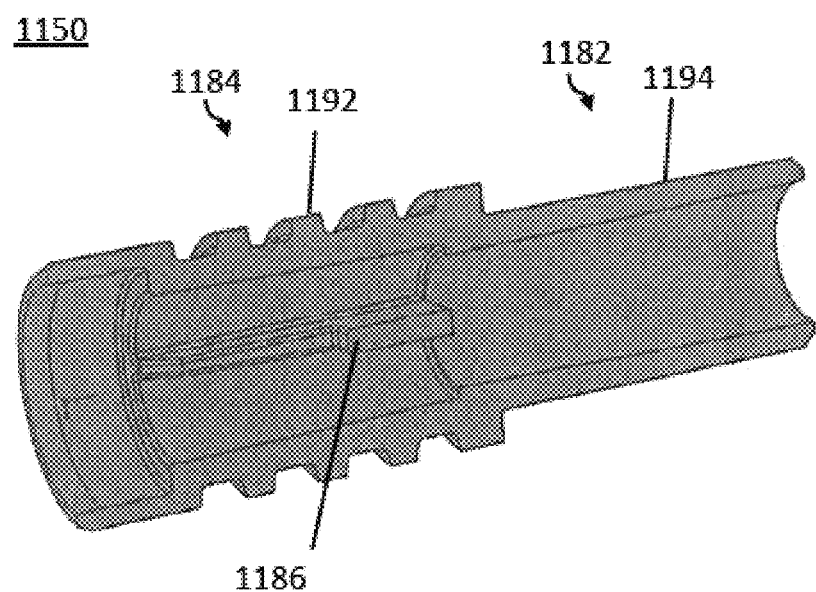
FIG. 11 illustrates one-half of an end piece (sliced longitudinally) of a treatment member for a module with removable elements, according to an embodiment.

FIG. 11 shows a cross-section of an end piece 1150 according to an embodiment. The end piece 1150 includes a first portion 1184 and a second portion 1182. The first portion 1184 includes a ribbed outer surface 1192 and an inner structure 1186. The second portion 1182 includes a smooth outer surface 1194 that passes through the inner and outer plates 436 and 428 in FIG. 4 or the fixing supports in FIGS. 10A and 10B. The ribbed outer surface 1192 is where a mesh material (e.g., the mesh tube 670 in FIG. 6) is attached, and the inner structure 1186 provides a stop for a rod (e.g., the rod 742 in FIG. 7). For example, an end portion of the mesh tube is attached to the ribbed outer surface 1192, and the inner structure 1186 functions to fix the rod in the longitudinal direction of the mesh tube.

Figure 12:
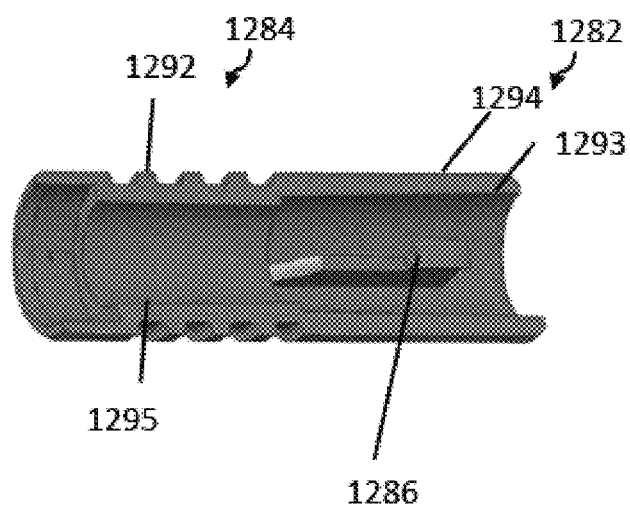
FIG. 12 illustrates one-half of an end piece (sliced longitudinally) of a treatment member for a module with potted elements, according to an embodiment.

FIG. 12 shows an end piece 1250 suitable for use in the treatment module 1000 in FIGS. 10A and 10B according to an embodiment. For example, the treatment members 1020 may be permanently potted in an epoxy layer rather than being individually removable and held in place by the two pairs of end-plates. The end piece 1250 includes a first portion 1284 and a second portion 1282. The first portion 1284 includes a ribbed outer surface 1292 and the second portion 1282 includes a smooth outer surface 1294. The second portion 1282 further has an inner surface 1293 having a size (e.g., a diameter) that is equal to or greater than that of an inner surface 1295 of the first portion 1284, thereby allowing a larger cross-section for water flow compared to the end piece 1150 in FIG. 11.

Hydraulic Operation of a Typical System.

Figure 13:
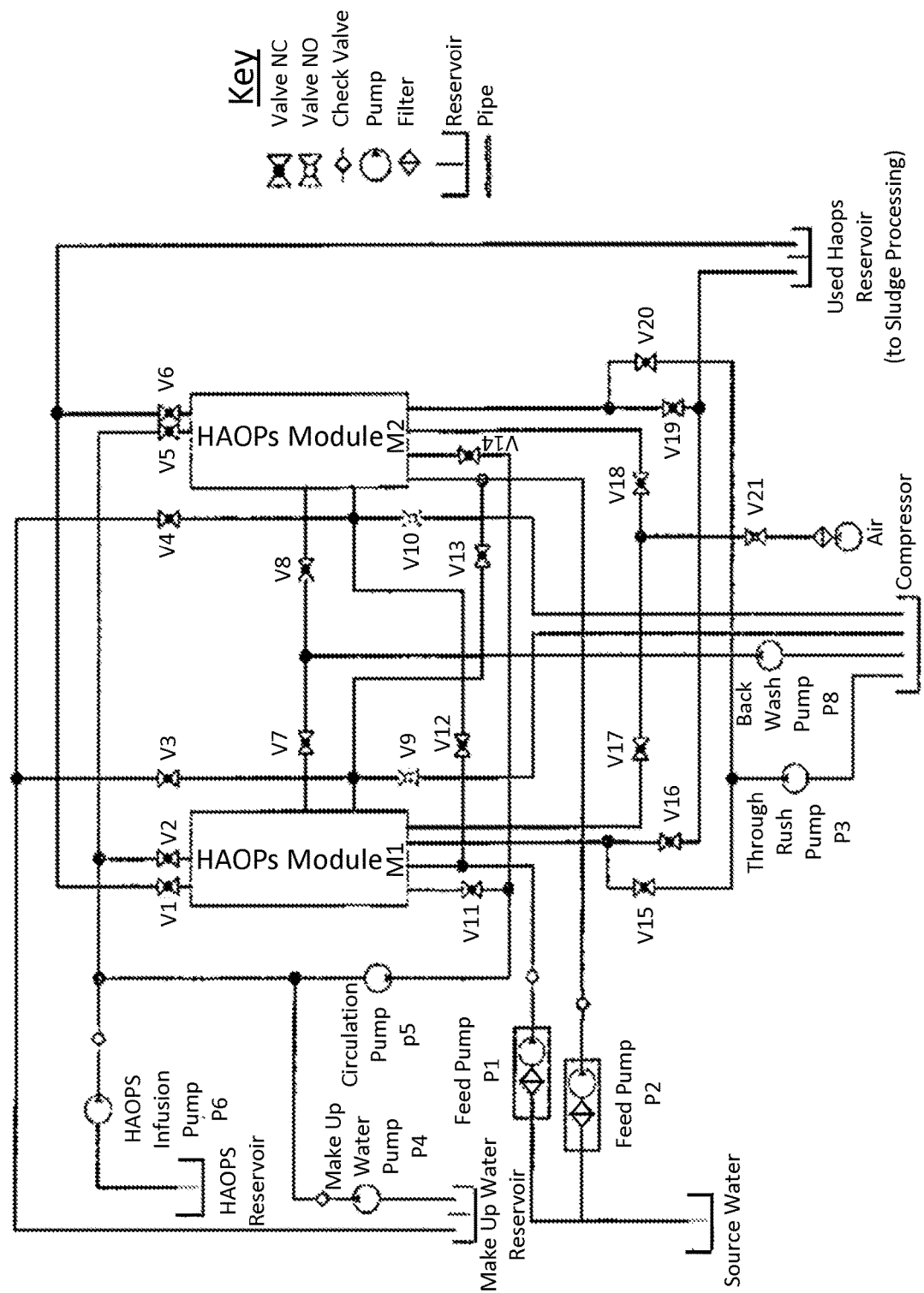
FIG. 13 illustrates a hydraulic system according to an embodiment.

FIG. 13 illustrates a hydraulic system that can perform one or more steps in the operation according to an embodiment. The pipes that are shown penetrating the module at the top and bottom are hydraulically connected to the "tube side" of the module (i.e., to the interiors of the tubes), whereas those that are shown penetrating the sides of the module are hydraulically connected to the "shell side" (i.e., inside the shell, but outside the tubes). The system can operate with one or more treatment modules functioning independently (parallel mode) or with the outflow from one module serving as the feed to the next module in the sequence (series mode).

Operating a Single Module in Isolation.

The sequence of steps applicable to a first module M1 operating alone or in parallel with a second module M2 is as follows. In an embodiment, the particles are deposited on the tube interiors, where the tube side of the module is the 'first side', and the shell side of the module is the 'second side'. Also, the embodiment relates to a system with two modules. It is understood that, with minor modifications, the same description applies to treatment systems in which the particles are deposited on the shell side and/or more than two modules are included.

I. Particle Deposition Step: The particle infusion pump injects particles from the treatment particle reservoir into the treatment members (tubes) in a first module M1. Water is injected into the interior of the mesh tubes from the bottom of the module. Some of the injected water exits those tubes from the top, and the rest passes through the tube walls, exits module M1 through a side port and flows to the Make Up Water Reservoir. When water flows through the mesh tubes, the particles in the water are captured by the mesh tubes and remain inside the tubes in module M1.

II. Particle Consolidation Step: After the desired mass of particles has been injected into the tubes, particle infusion is stopped, and all other processes continue as specified in the Particle Deposition Step until the water returning to the Make Up Water Reservoir is clear, indicating that substantially all of the injected particles have been retained on the tube walls.

III. Water Treatment Step: The feed water to be treated is injected into the tubes, passes through the adsorbent layer and mesh, and exits the module to flow to the Treated Water Reservoir. This step continues until a trigger condition is reached to terminate it. Typical trigger conditions include exceeding the specified maximum duration of the treatment step, exceeding the specified maximum contaminant concentration in the treated water, or exceeding the specified maximum energy required to drive water through the system.

IV. Module Cleaning Step: Feed injection is halted, and the tubes are backwashed by causing a first mixture of water and/or air to be injected into the shell side of module M1 (i.e., on the second side of the mesh), pass through the mesh from the second side to the first side, then and flow out of the tops and/or bottoms of the tubes in module M1. In an embodiment, a second mixture of water and air may be injected and follow the same flow path as the first backwashing mixture followed.

The tubes are then flushed by causing a first mixture of water and/or air to be injected into the tube interiors (i.e., on the first side of the mesh), entering at an open end of the tubes and flowing in the longitudinal direction of the module M1 during the flushing procedure. In an embodiment, a second mixture of water and/or air may be injected and follow the same flow path as the first flushing mixture followed.

The backwashing and flushing steps can be repeated sequentially several times. Once this step is completed, a new cycle begins with the Particle Deposition Step (Step I above).

Operating Multiple Modules in Parallel.

In an embodiment, multiple modules are operated in parallel. The piping and sequence of steps for each module replicate those described above for a single module, with some components (e.g., the feed pumps) dedicated to individual modules and others (e.g., the particle infusion pump) shared among several modules.

Operating Multiple Modules in Series.

In an embodiment, multiple modules are operated in series mode. To initiate water treatment:

I. The Particle Deposition Step and Particle Consolidation Step are carried out simultaneously or sequentially for the two modules, with each step identical to that for operation of a single module as described above.

II. First Water Treatment Step. In this step, water flows into and out of module M1 as when Module M1 is operated in isolation. However, the flow out of module M1 enters module M2; i.e., the feed to module M2 is the water that has been treated in module M1, rather than untreated water. Thus, water enters the tubes in module M1, exits through the side of module M1, and then enter the tubes in module M2 before exiting the side of module M2 and entering the Treated Water Reservoir. This step continues until one or more of the trigger conditions to end it are satisfied.

III. Cleaning module M1 and Returning it to Service. The untreated feed water enters module M2, as it would if module M2 were operating in isolation. The treated water from this module flows to the Treated Water Reservoir. Module M1 is cleaned as it would be if it were operating in isolation, after which the Particle Deposition and Particle Consolidation steps are carried out for module M1, using the same procedures as when module M1 is operated in isolation.

IV. Second Water Treatment Step. After the Particle Deposition and Particle Consolidation steps have been completed for module M1, the treated water exiting module M2 flows into the tubes in module M1. Thus, in this step, the feed water enters the tubes in module M2, exits through the side of module M2, then enters the tubes in module M1 before exiting the side of module M1 and entering the Treated Water Reservoir. This step continues until one or more of the trigger conditions to end it are satisfied.

V. Cleaning module M2 and Returning it to Service. The untreated feed water enters module M1, as it would if module M1 were operating in isolation. The treated water from this module flows to the Treated Water Reservoir. Module M2 is cleaned as it would be if it were operating in isolation, after which the Particle Deposition and Particle Consolidation steps are carried out for module M2, using the same procedures as when module M2 is operated in isolation.

VI. Third and Subsequent Water Treatment Steps. After the Particle Deposition and Particle Consolidation steps have been completed for module M2, the treated water exiting module M1 flows into the tubes in module M2. Thus, in this step, the feed water enters the tubes in module M1, exits through the side of module M1, then enters the tubes in module M2 before exiting the side of module M2 and entering the Treated Water Reservoir. When this step is ended because a trigger condition is reached, the system returns to the step "Cleaning M1 and Returning it to Service," and the final four steps III to VI in this sequence repeat.

Example 1: Phosphorus Removal from Domestic Wastewater Using μGAF with HAOPS

Excessive discharges of phosphorus (P) in treated sewage and urban and agricultural runoff have led to the choking of lakes, rivers, and bays with algae. In addition to their foul odor and unsightly appearance, these algae deplete the oxygen supply in the water, killing fish and other aquatic organisms, and release toxins that can force shutdowns of water treatment plants that provide water for human consumption. To avoid these impacts, phosphorus must be removed from wastewater to levels of approximately 0.05 mg/l or lower. Existing technologies cannot achieve this goal at reasonable cost. In the tests described here, phosphorus was removed from domestic wastewater that had been conventionally treated in a membrane bioreactor (MBR) by passing the water through a thin (<1 mm) layer of Heated Aluminum Oxide Particles (HAOPs) in a microgranular adsorptive filtration (μGAF) reactor.

Removal of P was investigated from MBR effluent from the Brightwater Wastewater Treatment Plant (WWTP) in Woodinville, Wash. The total phosphorus (TP) in these solutions was almost identical to the soluble reactive phosphorus (SRP), so only SRP was analyzed. HAOPs were synthesized as described by the following publication, the contents of which are incorporated by reference in their entirety: Kim, J., Cai, Z., Benjamin, M. M., 2008. Effects of adsorbents on membrane fouling by natural organic matter, J. Membr. Sci. 310, 356-364 (hereinafter, referred to as "Kim").

The tests were conducted using two modules, each containing six 2-foot-long mesh tubes with 14-mm diameters and 10-μm openings. HAOPs were deposited on the inner surface of these tubes, and the modules were operated in series as described in the preceding process description. The HAOPs loading on the mesh was 40 g Al/m$^2$, and the water flux through the tubes in each module was 200 LMH. The experiments lasted seven (7) days, with each filtration step lasting four hours (i.e., every four hours, the upstream module was taken offline, cleaned and returned to service in the downstream position).

Figure 14:
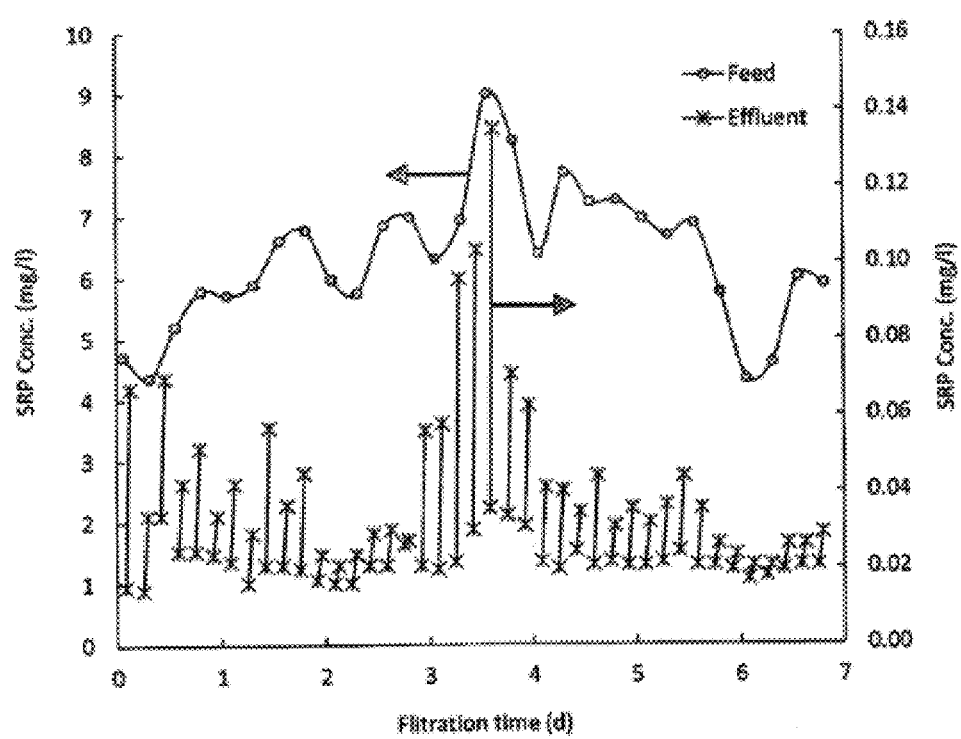
FIG. 14 illustrates filtration time and SRP concentration according to an embodiment.

As shown in FIG. 14, the effluent from the μGAF reactor always contained <0.05 mg SRP/l, with the only significant excursion occurring when the feed concentration briefly exceeded 9 mg/l. The average feed and filtrate SRP concentrations during the entire test were 6.32 and 0.032 mg/l, corresponding to 99.5% removal. Thus, μGAF treatment of domestic wastewater reliably achieved the goal of removing the vast majority of the P concentration from the wastewater and lowering the concentration in the final product to <0.05 mg/l.

Example 2: Removal of Natural Organic Matter from Drinking Water Sources and Mitigation of Membrane Fouling Using μGAF with HAOPs Alone or in Combination with Powdered Activated Carbon (PAC)

Natural organic matter (NOM) in drinking water sources is problematic for multiple reasons. Among these are that it reacts with disinfectants such as chlorine to form disinfection byproducts (DBPs) that are tightly regulated because they are suspected and/or known to be carcinogenic, and it can severely impede the performance of membranes that are used to remove pathogenic microorganisms and other contaminants. Although the conventional approach for capturing NOM—coagulation with aluminum or iron salts—can remove a portion of the NOM and mitigate membrane fouling, improving these outcomes remains a high priority in the drinking water field. Current USEPA regulations require that 0 to 50% of the total organic carbon (TOC) be removed from drinking water sources, depending on the TOC and the alkalinity in the raw water. TOC is an indicator of the NOM concentration.

The tests in this example were performed as described in the following publication, the contents of which are incorporated by reference in their entirety: S. Modarresi, M. M. Benjamin, 2018. Insights and model for understanding natural organic matter adsorption onto mixed adsorbents, Environ. Sci. Technol. 52, 6343-6349. Freshwater was collected from Lake Union (LU) at Portage Bay, Seattle, Wash. The pH of the water was 7.5±0.3. The samples contained 2.2-2.5 mg/l TOC and had UV absorbance at 254 nm (UV254) of 0.053-0.062 $cm^{-1}$. Almost all of the TOC was contributed by dissolved species, so the TOC was essentially identical to the DOC (dissolved organic carbon). The buffer capacity and ionic strength were increased by adding 0.5 mM each of $NaHCO_3$ and NaCl, and the pH was adjusted to 7.0±0.05. If this water were used as a drinking water source, the USEPA requirement would be that 35% of the TOC be removed by treatment. HAOPs were synthesized following the method of Kim. The PAC used in the study was Norit SA SUPER. All filtration tests used 47-mm disk filters installed into filter cartridges. Paper filters (Whatman®, grade 40) with a nominal pore size of 8 μm were used to hold the adsorbent in μGAF experiments. Polyethersulfone ultrafiltration (UF) membranes with a nominal pore size of 0.05 μm were used in membrane filtration experiments. For DBP formation potential (DBPFP) tests, the chlorine doses were chosen to generate residual free chlorine concentrations of 1.0±0.1 mg/l as $Cl_2$ after 24 hours of contact.

To pretreat the water by batch adsorption, flasks containing the water were dosed with the desired type(s) and amount(s) of adsorbent and placed on a rotary shaker for two hours. The solids were then removed by filtration through paper filters, and the solutions were used in subsequent membrane filtration experiments.

For pretreatment by μGAF, a cartridge was fitted with a paper filter, and a slurry of the adsorbent(s) was injected with a syringe while gently shaking the cartridge to help distribute the adsorbent uniformly. Feed was pumped into the μGAF unit to generate a constant flux of 150 LMH, and the effluent from the cartridge was collected for subsequent analysis or membrane filtration.

The effective adsorbent dose in these tests was defined as the ratio of the mass of adsorbent in the μGAF layer to the volume of water treated. The NOM removal efficiency for a given effective dose was defined as 1.0 minus the ratio of the DOC concentration in a composite sample to the DOC concentration of the feed, where the composite sample comprised all the treated water from the beginning of the experiment until the time when that effective dose was reached.

Figure 15:
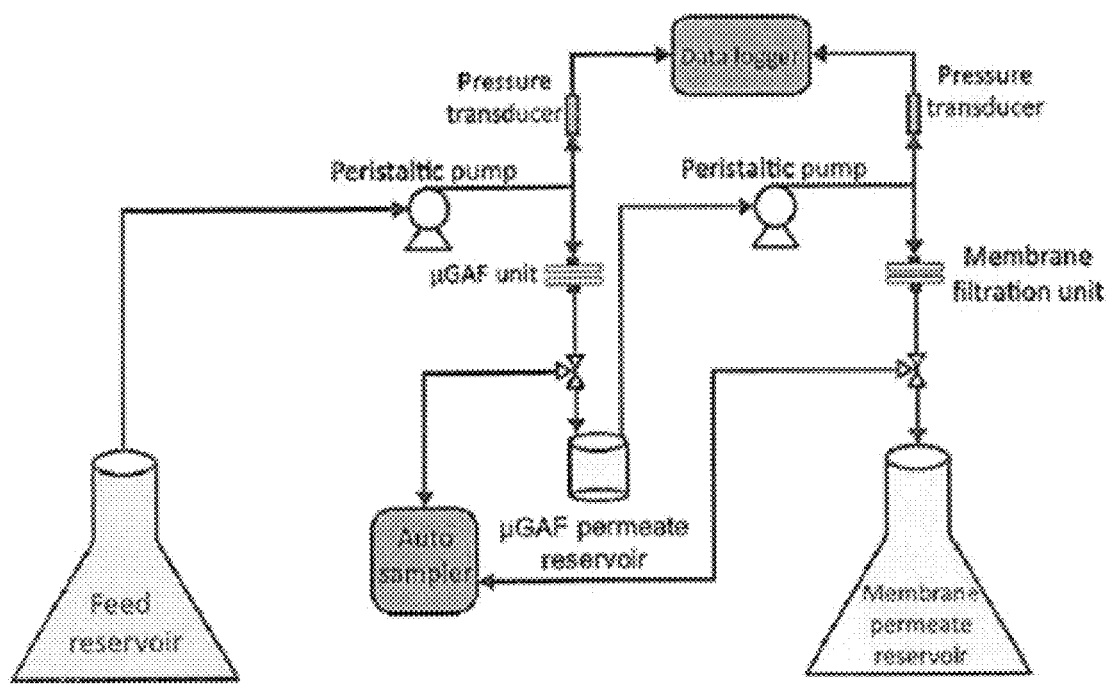
FIG. 15 illustrates an experimental setup according to an embodiment.

The membrane filtration tests were conducted in cartridges identical to those used for μGAF, but with a membrane replacing the paper filter, no pre-deposition of adsorbent, and a fixed flux of 100 LMH. The experimental set-up for the μGAF-membrane experiments is shown schematically in FIG. 15.

Figure 16:
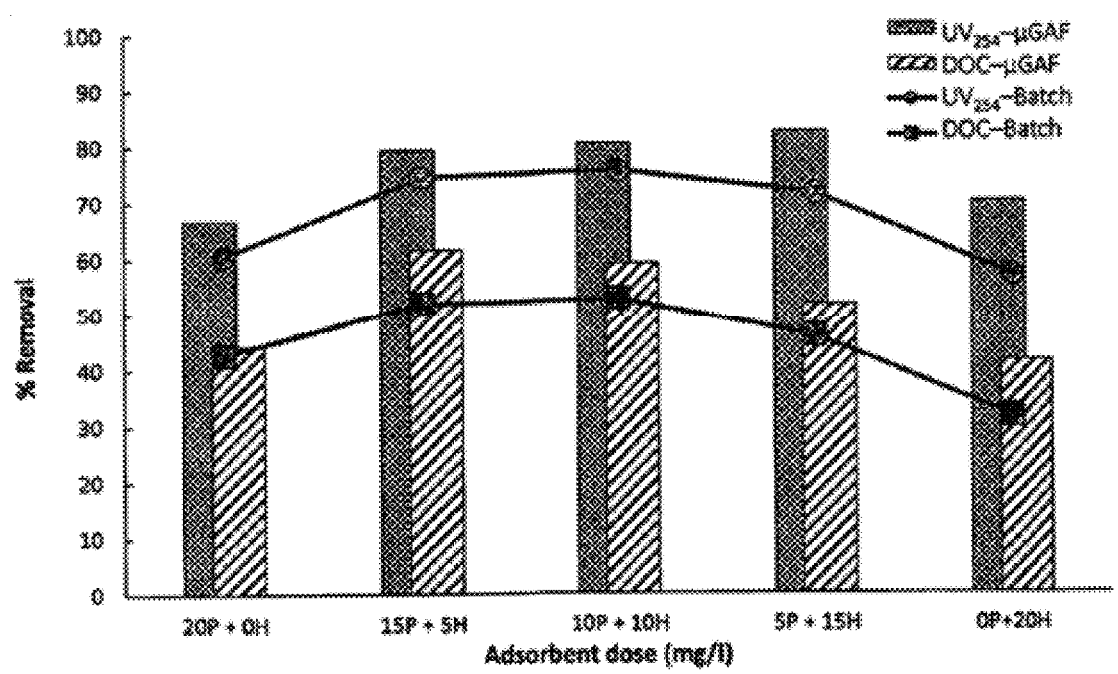
FIG. 16 illustrates adsorbent dose and percentage (%) of contaminant removal according to an embodiment.

The dissolved organic carbon (DOC) concentration and UV254 were used as indicators of the NOM concentration in these experiments. The NOM removal efficiencies achieved by μGAF using mixtures of the two adsorbents at a fixed effective adsorbent dose of 20 mg/l are shown in FIG. 16, along with the results from batch experiments at the same dose. A substantial fraction of the NOM was removed from the water in every experiment (enough to meet the EPA requirement for drinking water). NOM removal in the μGAF experiments was greater when the adsorbent comprised a mixture of HAOPs and PAC than when either adsorbent was present alone. Furthermore, for identical mixtures of the adsorbents, μGAF pretreatment always removed more NOM than batch pretreatment did.

Figure 17:
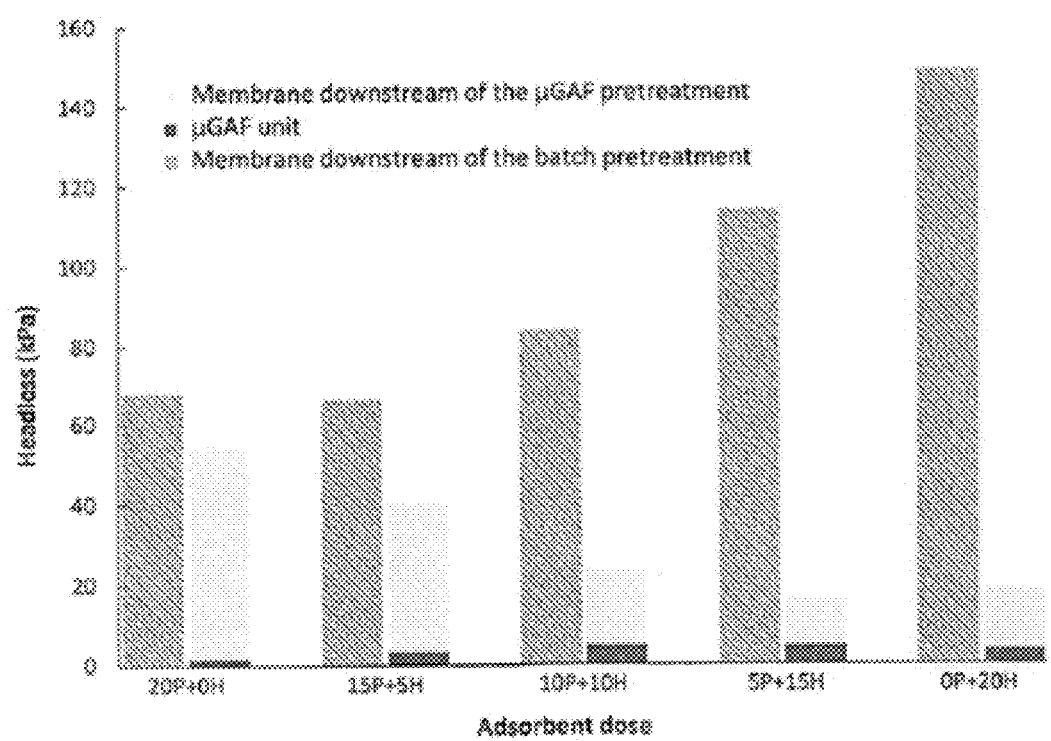
FIG. 17 illustrates adsorbent dose and head loss according to an embodiment.

Next, raw water and water that had been pretreated in each system characterized in FIG. 16 were fed to UF membranes. The magnitude and trends in fouling in all the systems investigated are compared in FIG. 17 for a fixed total effective adsorbent dose of 20 mg/l. For pretreatment by 20 mg/l PAC and no HAOPs (designated 20P+0H in the figure), switching from batch to μGAF pretreatment led to a detectable but small decline in overall system fouling. However, as PAC was replaced with HAOPs (i.e, moving from left to right in the figure), fouling of the membrane increased dramatically for batch pretreatment, whereas both membrane fouling and total (μGAF plus membrane) fouling decreased dramatically for μGAF pretreatment. As a result, at the other extreme (0P+20H), the overall system fouling after filtration of 2000 $l/m^2$ of water was almost an order of magnitude less severe for μGAF pretreatment than for the more conventional, batch approach to pretreatment.

Two tightly regulated groups of DBPs are trihalomethanes (THMs) and haloacetic acids (HAAs). The effectiveness of μGAF at reducing the THM formation potential (THMFP) and HAA formation potential (HAAFP) of the source water was evaluated in three of the waters discussed above: those treated with HAOPs only, with PAC only, and with a 1:1 mixture of the two adsorbents. As summarized below in Table 1, the mixed adsorbents reduced the THMFP and HAAFP more than either pure adsorbent did. Thus, μGAF treatment using either HAOPs alone or a mixture of HAOPs and PAC provided substantial benefits over more conventional water treatment approaches with respect to both removal of contaminants from the water and facilitating further treatment by membrane filters.

TABLE 1

DBP formation potential of μGAF-treated LU water

| Adsorbent and Effective Dose | THMFP (μg/l) | % Removal | HAAFP (μg/l) | % Removal |
|---|---|---|---|---|
| None (Raw LU Water) | 103.1 | | 60.9 | |
| 20 mg/l PAC | 37.4 | 63.7 | 19.7 | 67.6 |
| 20 mg/l HAOPs | 38.6 | 62.6 | 12.6 | 79.3 |
| 10 mg/l HAOPs + 10 mg/l PAC | 21.4 | 79.2 | 9.0 | 85.3 |

A1. An embodiment of the present disclosure includes a water purification apparatus, comprising:
   an elongated fluid permeable support frame having an outer perimeter;
   a mesh fabric substrate defining a closed surface mounted on and having an inner perimeter slightly greater than the outer perimeter of the support frame; and
   an adsorbent coated on the inner perimeter of the substrate selected from a group consisting of adsorbent particles, wherein the inner perimeter of the fabric substrate is sufficiently oversized compared to the outer perimeter of the frame to dislodge the adsorbent from the substrate.

A2. The apparatus of A1, wherein the frame is tubular.

A3. The apparatus of A1, wherein the adsorbent particles are selected from the group of HAOPs and HIOPs.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A treatment module, comprising:
   a housing having an input port and an output port;
   a plurality of treatment members, each treatment member having a skeleton and a mesh material provided over the skeleton, the mesh material being joined to the skeleton at one or more portions of the skeleton; and
   a layer of particles formed over a first side of the mesh material, the layer having pores of sufficient size to enable a fluid to flow through the layer,
   wherein the mesh material has dimensions such that when an appropriate force is applied, a gap of 1-10 mm is established between the mesh and the skeleton except at and near points of attachment.

2. The treatment module of claim 1, wherein the skeleton extends along a first direction and having a length L along the first direction, and the mesh material is flexible, and
   wherein the skeleton is configured to prevent the mesh material from collapsing entirely inward when a force is applied inward to the mesh material.

3. The treatment module of claim 2, wherein the mesh material is joined to the skeleton at first and second points of the skeleton along the first direction, the first and second points being separated from each other by at least L/10, so that the mesh material is able to fluctuate.

4. The treatment module of claim 3, wherein the first and second points of the skeleton are at first and second ends of the skeleton.

5. The treatment module of claim 4, wherein the mesh material is joined to the skeleton at one or more points along the first direction, the plurality of points being provided between the first and second ends of the skeleton, and
   wherein the first side of the mesh material is a side facing the skeleton or a side opposing the skeleton.

6. The treatment module of claim 4, further comprising:
   a first end piece joining the mesh material to the first end of the skeleton; and
   a second end piece joining the mesh material to the second end of the skeleton.

7. The treatment module of claim 6, wherein the mesh material is joined to the skeleton only at the first and second ends of the skeleton, whereby the mesh material is loosely covering the skeleton in order to allow the mesh material to fluctuate when forces are applied to the mesh material.

8. The treatment module of claim 2, wherein the skeleton has an elongated shape along the first direction, and the mesh material has a tubular shape covering the skeleton.

9. The treatment module of claim 1, wherein the skeleton has an elongated shape along the first direction, and
   wherein the skeleton includes a plurality of ribs, the ribs having a geometry that allows fluid to flow therethrough in parallel to and perpendicular to the first direction.

10. The treatment module of claim 9, wherein the skeleton further includes a rod held by the ribs, the rod providing a structural support for the element along the first direction.

11. The treatment module of claim 1, wherein the mesh material is formed as a flat sheet over the skeleton.

12. The treatment module of claim 1, wherein each of the treatment members is configured to be removable from the housing.

13. The treatment module of claim 1, wherein the treatment members are bonded together at least on one end by potting.

14. A treatment member, comprising:
   a skeleton including a plurality of ribs and optionally a stiffening rod, the skeleton extending along a first direction and having a length L along the first direction, the rod providing a structural rigidity for the skeleton along the first direction; and
   a flexible mesh tube provided around the skeleton and configured to fluctuate when forces are applied to the mesh tube,
   wherein the mesh tube is joined to the skeleton at first and second points of the skeleton along the first direction, the first and second points being separated from each other by at least L/10.

15. The treatment member of claim 14, wherein the mesh tube has an inner diameter of at least 3 mm.

16. A method for operating a treatment module, the method comprising:
   providing a plurality of a treatment members, each treatment member having a support structure and a mesh material provided over a first side of the support structure;
   flowing a first fluid of a first type through the treatment members; and
   flowing a second fluid of a second type through the treatment members, the first and second types being different fluid types;
   wherein forces applied by the first and second fluids to the mesh material cause particles collected on the mesh material to be released from the mesh material, and
   wherein the first fluid of the first type is gas, and the second fluid of the second type is liquid.

17. The method of claim 16, wherein the method relates to cleaning the treatment module, and
   wherein the mesh material is flexible and is configured to fluctuate or partially collapse and expand chaotically when the forces are applied to the mesh material by the first and second fluids.

18. The method of claim 17, further comprising:
   flowing a third fluid of the first type through the treatment members; and
   flowing a fourth fluid of the second type through the treatment members.

19. The method of claim 18, wherein the first and second fluids are flowed through the treatment members in a first direction, and the third and fourth fluids are flowed through the treatment members in a second direction that is substantially orthogonal to the first direction.

20. The method of claim 18, wherein each of the treatment members includes a layer formed on the mesh material, with the layer comprising contaminant-collecting particles, the method further comprising:

flowing a solution including contaminants through the treatment members, the layer of contaminant-collecting particles formed on the mesh material collecting the contaminants in the solution, wherein the forces applied by the fluids cause the contaminants collected by the layer to be released from the mesh material.

21. The method of claim 16, wherein the support structure is a skeleton having a plurality of ribs and optionally a stiffening rod, the skeleton having an elongated shape extending along the first direction, and wherein the mesh material covers the skeleton and has a tubular shape.

22. The method of claim 16, wherein the first fluid and the second fluid are flowed simultaneously as a mixture through the treatment members.

\* \* \* \* \*